United States Patent [19]
LaBounty

[11] Patent Number: 5,142,779
[45] Date of Patent: Sep. 1, 1992

[54] MOBILE WOOD AND TIRE SHEAR

[75] Inventor: Roy E. LaBounty, Two Harbors, Minn.

[73] Assignee: LaBounty Manufacturing, Inc., Two Harbors, Minn.

[21] Appl. No.: 801,696

[22] Filed: Dec. 2, 1991

[51] Int. Cl.⁵ .............................................. B23P 19/00
[52] U.S. Cl. ...................................... 30/134; 30/228; 83/694; 144/2 N; 144/34 E
[58] Field of Search .................. 30/134, 228, 231, 266, 30/92; 83/694; 37/2 R, 117 S; 144/2 N, 34 R, 34 E

[56] References Cited

U.S. PATENT DOCUMENTS

| Re. 26,992 | 11/1970 | Rehnstrom | 30/134 |
|---|---|---|---|
| 3,802,731 | 4/1974 | LaBounty | 30/134 |
| 3,814,152 | 6/1974 | Pallari | 30/134 |
| 3,972,097 | 8/1976 | Schakat | 30/134 |
| 4,005,894 | 2/1977 | Tucek | 30/134 |
| 4,104,792 | 8/1978 | LaBounty | 30/134 |
| 4,168,729 | 9/1979 | Tausig et al. | 30/134 |
| 4,198,747 | 4/1980 | LaBounty | 30/134 |
| 4,274,457 | 6/1981 | Nilsen | 30/134 |
| 4,403,431 | 9/1983 | Ramun et al. | 144/34 E |
| 4,439,921 | 4/1984 | Ramun et al. | 30/134 |
| 4,519,135 | 5/1985 | LaBounty | 30/134 |
| 4,536,976 | 8/1985 | Holopainen . | |
| 4,541,177 | 9/1985 | Hollander . | |
| 4,558,515 | 12/1985 | LaBounty . | |
| 4,670,983 | 6/1987 | Ramun et al. . | |
| 4,776,093 | 10/1988 | Gross | 30/134 |
| 4,908,946 | 3/1990 | LaBounty . | |

FOREIGN PATENT DOCUMENTS 964170  3/1975  Canada .
2122125  6/1982  United Kingdom .

*Primary Examiner*—W. Donald Bray
*Attorney, Agent, or Firm*—Palmatier & Sjoquist

[57] ABSTRACT

A heavy duty mobile wood and tire shear having a lower stationary jaw rigidly attachable to the dipper stick of a hydraulic excavator. The lower jaw has a forwardly extending face plate for receiving and supporting the workpiece with two forwardly extending tines. An upper C-shaped swingable jaw is pivotally mounted to the lower jaw and connected to the hydraulic cylinder of the dipper stick. The swingable jaw has a cutting blade with a knife-like edge. The upper jaw swings between open and closed positions relative to the lower jaw as to bring the cutting blade down upon the face plate as to penetrate and shear through wood. Shearing blades are releasably affixable along the knife-like edge of the cutting blade and along the face plate as to bring the shearing blades into shearing relation as the upper jaw approaches the closed position as to also shear through tires.

32 Claims, 3 Drawing Sheets

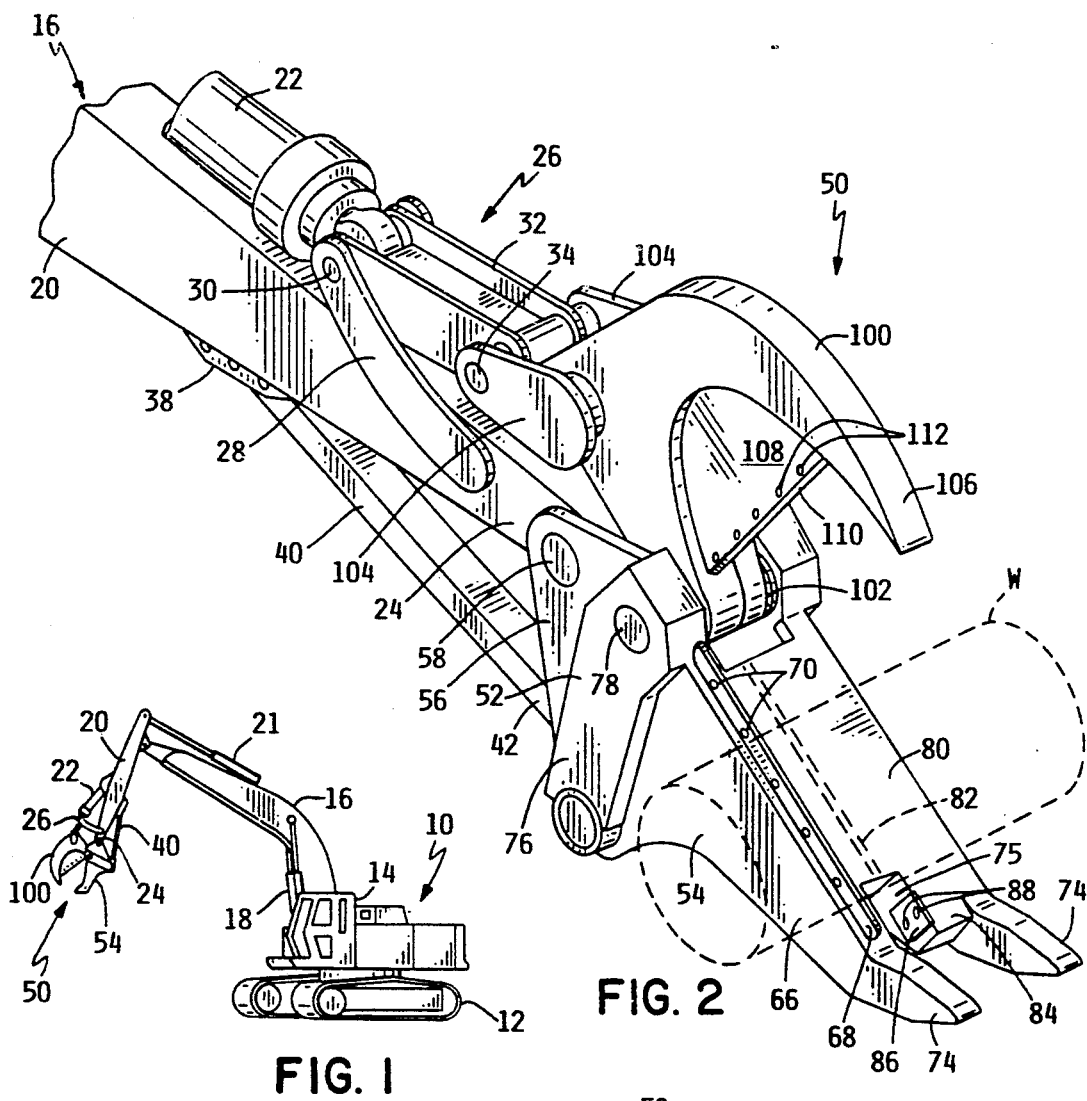
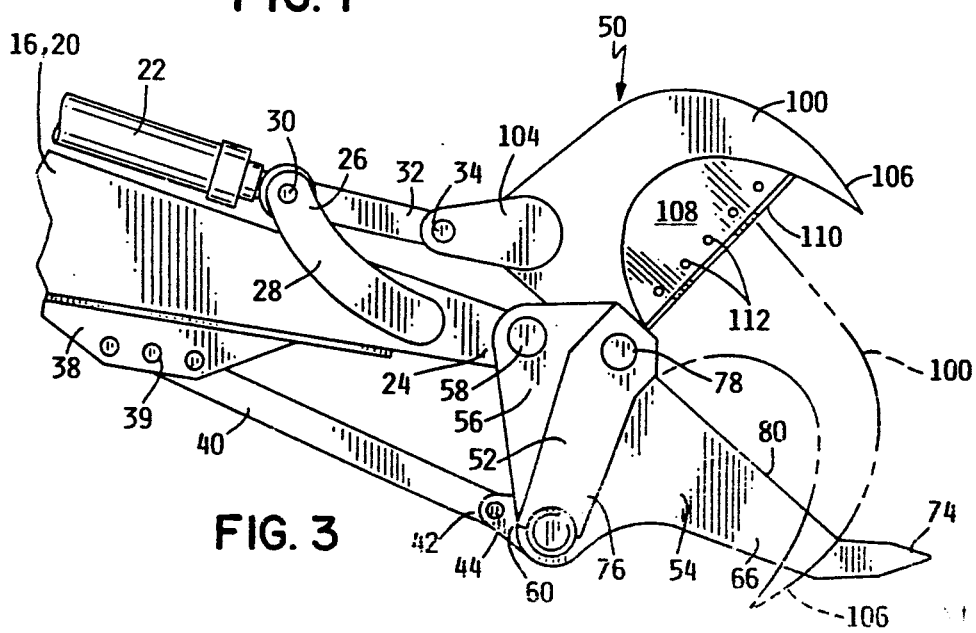

MOBILE WOOD AND TIRE SHEAR

BACKGROUND OF THE INVENTION

This invention relates to an attachment for a mobile machine and more particularly to a heavy duty mobile wood and tire shear attachment for connection to the dipper stick and hydraulic cylinder of a hydraulic excavator.

In land development operations and scrap and recycling yards, it is typical for old tires, trees and stumps to be present which are especially difficult to handle and haul away. Consequently, the wood products, such as oversize stumps from land clearings, are to be down sized to a size acceptable by chippers and shredders for further processing. The same case applies with respect to rubber tires in that they preferably should be reduced to a size acceptable for further processing. U.S Pat. No. 3,814,152 issued to Pallari on Jun. 4, 1974 shows one type of a stump pulling and crushing device attachable to a hydraulic excavator. The crushing device has a stump hook for pulling a stump out of the ground and a three blade shear for splitting the stump. Co-owned U.S. Pat. No. 4,908,946 issued to LaBounty on Mar. 20, 1990 also discloses a wood cutting shear having a swingable jaw and a stationery jaw. The stationary jaw is integral with a sizeable frame structure attachable to the boom of an excavator. This shear necessitates its own hydraulic cylinder mounted on the frame. Neither of these shears were designed for cutting tires.

Co-owned U.S. Pat. No. 4,104,792 issued to LaBounty on Aug. 8, 1978, claims a wheel and tire cutter comprised of a grapple for a back hoe having a three blade shear secured to the back side of the lower jaw of the grapple. However, this device is not designed for shredding or shearing of wood products such as stumps.

There is a need for a heavy duty mobile shear that will shear or tear through wood that is readily adaptable for the releasable mounting of tire shearing blades for the reduction and processing of tires.

SUMMARY OF THE INVENTION

A heavy duty mobile wood and tire shear having a lower stationary jaw rigidly attachable to the dipper stick of a hydraulic excavator. The lower jaw has a forwardly extending face plate for receiving and supporting the workpiece with two forwardly extending tines. An upper C-shaped swingable jaw is pivotally mounted to the lower jaw and connected to the hydraulic cylinder of the dipper stick. The swingable jaw has a cutting blade with a knife-like edge. The upper jaw swings between open and closed positions relative to the lower jaw as to bring the cutting blade down upon the face plate as to penetrate and shear through wood. Shearing blades are releasably affixable along the knife-like edge of the cutting blade and along the face plate as to bring the shearing blades into shearing relation as the upper jaw approaches the closed position as to also shear through tires.

A principal object and advantage of the present invention is that the shear is relatively simple and inexpensive to manufacture while yet being an excavator tool capable for both down sizing wood products and reducing rubber tires for further processing.

Another object and advantage is that the shear attachment comprises the third member to be connected to the excavator dipper stick of any of a variety of excavators utilizing the standard bucket cylinder and linkage group much like a contractor's grapple.

Another object and advantage of the present invention is that the shear has forwardly extending tines for pulling of stumps out of the ground as well as for gripping and captivating either the stump or tire to be split or sheared.

BRIEF DESCRIPTION OF THE DRAWINGS

FIG. 1 is a side elevational view of a hydraulic excavator with a boom structure supporting the mobile wood and tire shear of the present invention;

FIG. 2 is a perspective view of the mobile wood and tire shear connected to the dipper stick and hydraulic cylinder set up for splitting wood;

FIG. 3 is a side elevational view of the shear of FIG. 2 showing the range of movement of the upper C-shaped swingable jaw;

DETAILED SPECIFICATION

Figures 4, 5:
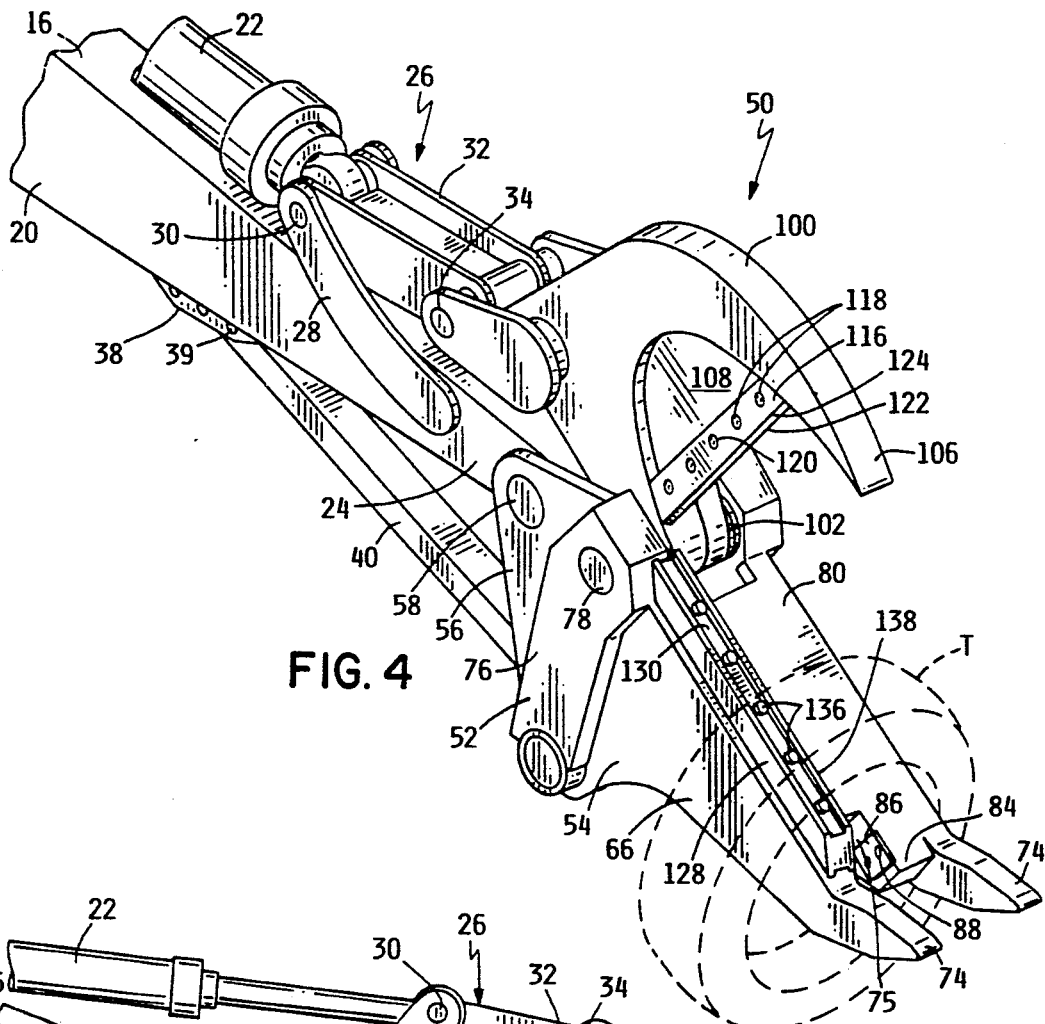
FIG. 4 is a side elevational view of the wood and tire shear set up for shearing or reducing tires.
FIG. 5 is a side elevational view of the wood and tire shear of FIG. 4 with the upper swingable jaw approaching the closed position and the tie plates shown in broken outline.
Figure 6:
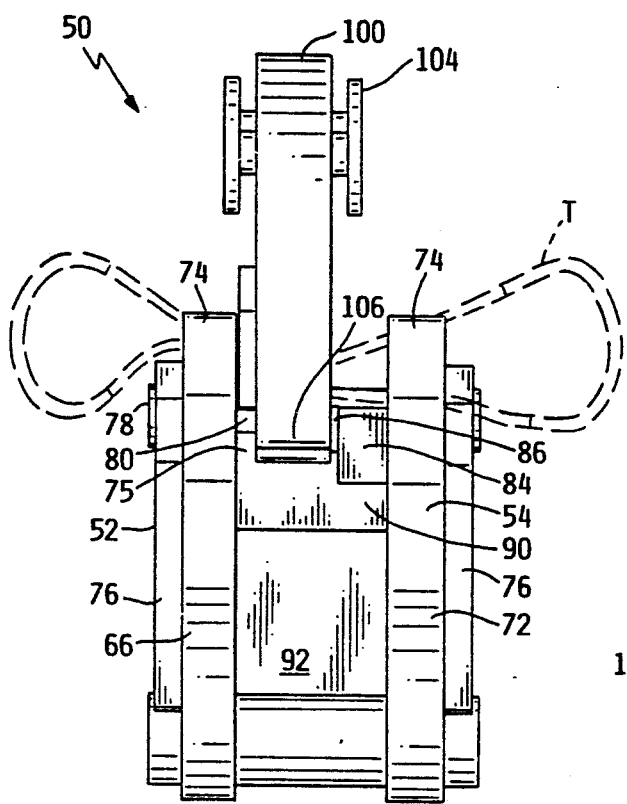
FIG. 6 is a front elevational view of the shear taken along lines 6—6 of FIG. 5 with a tire in broken outline between the jaws.
Figure 8:
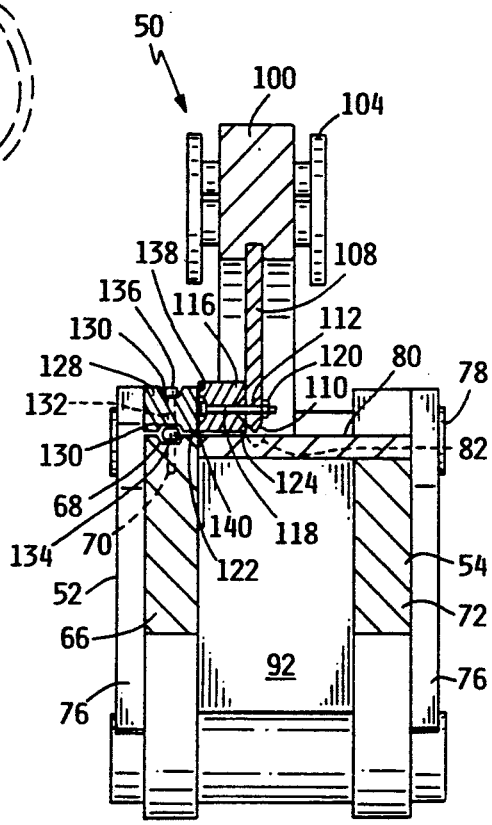
FIG. 8 is a view similar to FIG. 7 with the upper swingable jaw in completely closed condition.
Figure 7:
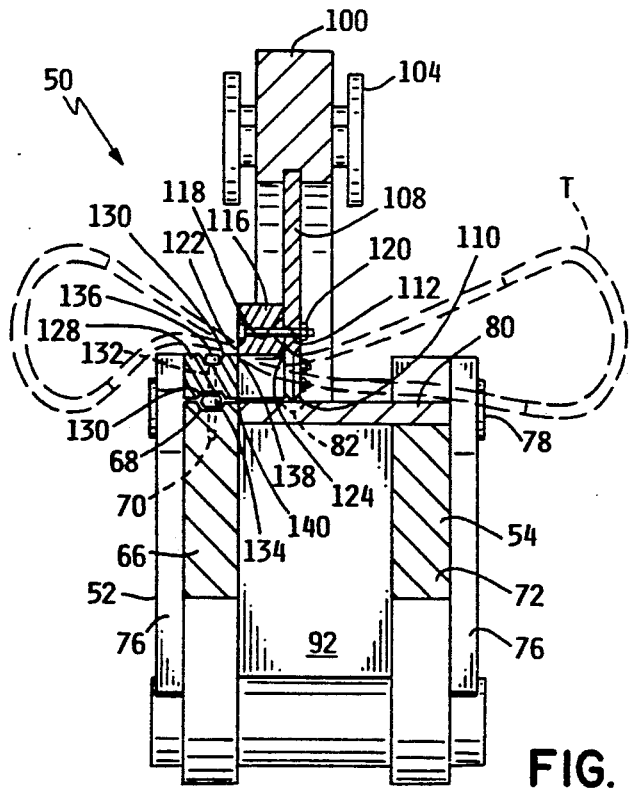
FIG. 7 is a view taken along lines 7—7 of FIG. 5 with the jaws in nearly closed position and shearing the tire in broken outline.

Referring to FIG. 1, a mobile lifting machine may be a hydraulic excavator 10. The excavator 10 is mounted on a track 12 for moving the excavator about on the ground. Above the track is a rotatable swinghouse 14 which supports a boom structure. Boom 16 has a boom hydraulic cylinder 18 between the boom 16 and the swinghouse 14 for controlling the upward and downward movement of the boom 18. Extending from the boom 18 is a dipper stick 20 which is articulable by way of a boom-dipper stick hydraulic cylinder 21 mounted on the boom 18. Also mounted on the dipper stick 20 is a dipper stick-attachment hydraulic cylinder 22 extending toward the distal end 24 of the dipper stick. Cylinders 18, 21 and 22 are connected to the hydraulic system of the excavator 10. The dipper stick 20 normally has an attachment-cylinder linkage group 26 for connection between the ram of the hydraulic cylinder 22, the distil end 24 of the dipper stick 20 and to the attachment or the mobile wood and tire shear 50 of the present invention. The linkage group 26 is comprised of a first or rear pair of links 28 pivotally mounted to the dipper stick 20 with pin 30 connected to the ram end of the cylinder 21 and to a second or forward pair of links 32, the ends of which will support and hold an attachment pin 34.

The underside of the dipper stick 20 supports a stiff-leg bracket 38 captivating a pin 39 which will pivotally connect to a stiff leg 40. The leg's distil end 42 further connects to the attachment by a mounting pin 44.

Referring to FIGS. 2 through 8 and particularly FIGS. 2 and 3, the mobile wood and tire shear 50 of the present invention may be generally seen. The shear 50 includes a shear body 52 with a lower rigid or stationary jaw 54 extending forwardly from the shear body 52. Rearwardly on the shear body 52 are located dipper stick brackets or ears 56 which will support a mounting pin 58 which will connect to the distil end 24 of the dipper stick 20. Also rearwardly of the shear body 52 are located stiff leg brackets or ears 60 which will appropriately captivate the attachment mounting pin 44 thereby rigidly connecting the shear body 52 with its lower stationary jaw 54 to the dipper stick 20.

The shear body 52 and lower jaw 54 further comprise a right triangular side plate 66 with a keyway 68 along its top surface having threaded apertures 70 extending downwardly therein. Spaced from the right side plate 66 is located a left triangular side plate 72. The forward ends of plate 66 and 72 are formed into gripping or digging tines 74 with a slot 75 therebetween. Rearwardly is located a pivot pin with a thrust washer and bushing or bearing arrangement for the pivotal connection of the upper swingable jaw 100 described more fully below. Between the upper edges of the side plate 66 and 72 is located a bed or face plate 80. Plate 80 optionally may have an upper blade relief groove or channel 82. Upper swingable jaw 100 guide means are provided and include guide block 84 extending from face plate 80 between tines 74 and adjacent slot 75. The guide block 84 has a removable guide plate 86 which is securely held in place suitably by threaded bolts 88. Extending between side plates 66 and 72 are located forward tie plate 90 and rearward tie plate 92 adding support and rigidity to the shear body 52 and lower jaw 54 (FIG. 5).

The upper swingable jaw 100 is C-shaped and has a rearward pivot structure 102 for pivotal interconnection with the pivot pin structure 78 of the lower jaw 54. Extending forwardly from the swingably jaw 100 is a nose tine 106 suitably for gripping, digging, splitting or capturing the workpiece as the nose tine 106 will fit within slot 75 as it is guided therein by the guide block 84 and guide plate 86. The C-shaped jaw 100 supports a cutting blade 108 having a beveled or knife-like edge 110. Along the edge 100 are located apertures 112. As described, the mobile wood and tire shear 50 will readily cut, split or shear wood, logs or stumps W that readily may be captured in between jaws 54 and 100 by action of the cutting blade 108 being forced downwardly toward and into engagement with the face plate 80 and possibly into optionable relief groove 82.

Mobile wood and tire shear 50 may be readily and easily adapted for the shearing or reduction of tires T as specifically shown in FIGS. 4 through 8. Upper tire shearing blade 116 is generally rectangular in shape and somewhat trapezoidal and made of hardened steel. Shearing blade 116 has recessed apertures 118 therethrough appropriate for receiving a bolt and nut combination 120 therethrough as the bolt 102 extends through apertures 118 and apertures 112 of cutting blade 108 for securing the upper tire shearing blade 116 along the beveled edge 100 of the upper cutting blade 108. As can be seen, the upper tire shearing blade is reversible in that it may be removed, rotated and again mounted along the beveled edge 110 thus having a first cutting edge 122 and a second cutting edge 124 when the upper tire shearing blade 116 is reversed. Referring to the lower jaw 54, lower tire shearing blade 128 is comparable to upper tire shearing blade 116 in that it is generally rectangular in cross section and a parallelogram in shape as well as being made of a hardened steel. The lower blade 128 has top and bottom keyways 130 with apertures 132 extending therebetween. A key 134 With holes therethrough is generally six-sided in shape to suitably fit within the keyway 68 of the lower jaw 54 and either of the top or bottom keyways 130 of the lower tire shearing blade 120 for proper and secure location of the lower shearing blade 128 along the face plate 80 of the lower jaw 54. Threadable bolts 136 appropriately are fitted into the apertures 132 of the lower shearing blade 128 and pass through the key 134 and into the threaded apertures 70 of the lower jaw 54. As can be seen, lower tire shearing blade 128 is reversible thereby having a first cutting edge 138 and a second cutting edge 140 similar to the upper tire shearing blade 116 for extended use of the blades 116 and 128.

Connection of the mobile wood and tire shear 50 to the boom structure of the hydraulic excavator 10 is relatively simple. The distal end 24 of the dipper stick is connected by way of mounting pin 58 to the dipper stick brackets 56 at the rear of the shear body 52. A stiff leg 40 is connected between stiff leg bracket 38 of the dipper stick 20 and the stiff leg brackets or ears 60 rearwardly located on the shear body 52. By this arrangement, the lower jaw 54 is rigidly connected to the dipper stick 20. Next, the pivotally mounted ears 104 located rearwardly on the upper jaw 100 are connected to the linkage group 26 by way of attachment pin 34. Consequently, the dipper stick-attachment hydraulic cylinder 22 of the dipper stick 20 may articulate the upper swingable jaw 100 between open and closed positions relative to the lower jaw 54 as to bring the cutting blade 108 down upon the face plate 80 as to penetrate, shear and/or split through wood W.

The gripping or digging tines 74 of the lower jaw 54 together with a nose tine 106 of the swingably upper jaw 100 will generally assist in captivating the workpiece to be processed. Further still, the tines 74 and 106 will assist in gripping, digging, splitting, capturing or otherwise pulling a stump from out of the ground.

When it is desired to reduce tires, the optional upper and lower tire shearing blades 116 and 128 may be affixed to the cutting blade 108 and face plate 80 by the releasable mounting means described. Thereafter, tires T may be readily picked up and captured by action of the gripping tines 74 and the nose tine 106. As the upper swingable jaw 100 is brought downwardly towards its closed position, the first cutting edges 122 and 138 perform a shearing function as to reduce tires T. The guide means 84 and 86 assure shearing engagement. When the cutting edges 122 and 138 become dull or worn, the upper and lower tires shearing blades 116 and 128 can be removed from their mounting position and rotated as to alignably expose second cutting edges 124 and 140 for renewed shearing and tire T reduction. Should the operator again wish to split or shear wood W, the upper and lower tire shearing blades 116 and 128 may be removed from the shear 50 quite easily and expeditiously.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

WHAT IS CLAIMED:

1. A heavy duty mobile shear for workpieces, such as wood, for connection to the dipper stick and hydraulic cylinder of a mobile machine such as a hydraulic excavator, comprising:

(a) a lower stationary jaw rigidly attachable to the dipper stick having a forwardly extending face plate for receiving and supporting the workpiece with two tines extending forwardly from the face plate; and (b) an upper C-shaped swingable jaw having a cutting blade with a knife-like edge, the upper jaw being pivotally mounted to the lower jaw and connected to the hydraulic cylinder as to swing the upper jaw between opened and closed positions relative to the lower jaw and to bring the cutting blade down upon the face plate as to penetrate and shear through wood.

2. The shear of claim 1 further comprising releasable mounting means for affixing a first shearing blade along the knife-like edge of the cutting blade and for affixing a second shearing blade along the face plate as to bring the shearing blades into shearing relation as the upper jaw approaches the closed position as to shear through tires.

3. The shear of claim 2, wherein the shearing blades are reversible with two cutting edges for extended use.

4. The shear of claim 2, wherein the releasable mounting means comprise apertures through the shearing blades, the cutting blade and into the face plate adapted to receive bolts to releasably mount the shearing blades.

5. The shear of claim 4, further comprising a key between the second shearing blade and the face plate.

6. The shear of claim 1, further comprising, a first shearing blade releasably affixable along the knife-like edge of the cutting blade and a second shearing blade releasably affixable along the face plate as to bring the shearing blades into shearing relation as the upper jaw approaches the closed position as to also shear through tires.

7. The shear of claim 6 wherein the shearing blades are reversible with two cutting edges for extended use.

8. The shear of claim 6, wherein the releasable mounting means comprises apertures through the shearing blades, the cutting blade and into the face plate adapted to receive bolts to releasably mount the shearing blades.

9. The shear of claim 8, further comprising a key between the second shear blade and the face plate.

10. The shear of claim 1 further comprising a nose tine on the upper jaw and a slot between the two tines of the lower jaw for receiving the nose tine.

11. The shear of claim 10 further comprising guide means extending from the face plate into the slot adjacent one tine for guiding engagement with the nose tine on the upper C-shaped jaw as the upper jaw swings from opened to closed positions.

12. The shear of claim 1, further comprising a stiff leg extending from the lower jaw to the dipper stick.

13. The shear of claim 1, wherein the upper jaw has a pair of pivotally mounted ears rearwardly mounted thereto for connection to an attachment-cylinder linkage group which is further connected to the hydraulic cylinder.

14. The shear of claim 1, further comprising an upper jaw cutting blade relief groove in the face plate.

15. A heavy duty mobile wood and tire workpiece shear for connection to the dipper stick and hydraulic cylinder of a mobile machine such as a hydraulic excavator, comprising:

(a) a lower stationary jaw rigidly attachable to the dipper stick having a forwardly extending face plate for receiving and supporting the workpiece;

(b) an upper C-shaped swingable jaw having a cutting blade with a knife-like edge, the upper jaw being pivotally mounted to the lower jaw and connected to the hydraulic cylinder as to swing the upper jaw between opened and closed positions relative to the lower jaw and to bring the cutting blade down upon the face plate as to penetrate and shear through wood; and (c) a first shearing blade releasably affixable along the knife-like edge of the cutting blade and a second shearing blade releasably affixable along the face plate as to bring the shearing blades into shearing relation as the upper jaw approaches the closed position as to also shear through tires.

16. The shear of claim 15 further comprising releasable mounting means for affixing the first shearing blade along the knife-like edge of the cutting blade and for affixing the second shearing blade along the face plate as to bring the shearing blades into shearing relation as the upper jaw approaches the closed position as to shear through tires.

17. The shear of claim 16, wherein the releasable mounting means comprise apertures through the shearing blades, the cutting blade and into the face plate adapted to receive bolts to releasably mount the shearing blades.

18. The shear of claim 15 wherein the shearing blades are reversible with two cutting edges for extended use.

19. The shear of claim 15, further comprising a key between the second shear blade and the face plate.

20. The shear of claim 15 further comprising a nose tine on the upper jaw and a slot between the two tines of the lower jaw for receiving the nose tine.

21. The shear of claim 20 further comprising guide means extending from the face plate into the slot adjacent tone tine for guiding engagement with the nose from opened to closed positions.

22. The shear of claim 15, further comprising a stiff leg extending from the lower jaw to the dipper stick.

23. The shear of claim 15, wherein the upper jaw has a pair of pivotally mounted ears rearwardly mounted thereto for connection to an attachment-cylinder linkage group which is further connected to the hydraulic cylinder.

24. The shear of claim 15, further comprising an upper jaw cutting blade relief groove in the face plate.

25. A heavy duty mobile shear for workpieces, such as wood, for connection to the dipper stick and hydraulic cylinder of a mobile machine such as a hydraulic excavator, comprising:

(a) a lower stationary jaw rigidly attachable to the dipper stick having a forwardly extending face plate for receiving and supporting the workpiece with two tines extending forwardly from the face plate with a slot therebetween;

(b) an upper C-shaped swingable jaw having a nose tine and a cutting blade with a knife-like edge, the upper jaw being pivotally mounted to the lower jaw and connected to the hydraulic cylinder as to swing the upper jaw between opened and closed positions relative to the lower jaw and to bring the nose tine into the slot and the cutting blade down upon the face plate as to penetrate and shear through wood; and (c) a reversible first shearing blade releasably affixable along the knife-like edge of the cutting blade and a reversible second shearing blade releasably affixable along the face plate as to bring the shearing blades into shearing relation as the upper jaw approaches the closed position as to also shear through tires.

26. The shear of claim 25, further comprising apertures through the shearing blades, the cutting blade and into the face plate adapted to receive bolts to releasably mount the shearing blades.

27. The shear of claim 25, further comprising a key between the second shearing blade and the face plate.

28. The shear of claim 25 further comprising guide means extending from the face plate into the slot adjacent one tine for guiding engagement with the nose tine on the upper C-shaped jaw as the upper jaw swings from opened to closed positions.

29. The shear of claim 25, further comprising a tiff leg extending from the lower jaw to the dipper stick.

30. The shear of claim 25, wherein the upper jaw has a pair of pivotally mounted ears rearwardly mounted thereto for connection to an attachment-cylinder linkage group which is further connected to the hydraulic cylinder.

31. The shear of claim 25 further comprising an upper jaw cutting blade relief groove in the face plate.

32. A heavy duty mobile shear for workpieces, such as wood, tires and the like, for connection to the dipper stick and hydraulic cylinder of a mobile machine such as a hydraulic excavator, comprising:
  (a) a lower stationary jaw rigidly attachable to the dipper stick having a forwardly extending face plate for receiving and supporting the workpiece with two tines extending forwardly from the face plate with a slot therebetween;
  (b) an upper C-shaped swingable jaw having a nose tine and cutting blade with a knife-like edge, the upper jaw being pivotally mounted to the lower jaw and connected to the hydraulic cylinder as to swing the upper jaw between opened and closed positions relative to the lower jaw and to bring the nose tine into the slot and the cutting blade down upon the face plate as to penetrate and shear through wood;
  (c) releasable mounting means for affixing a first shearing blade along knife-like edge of the cutting blade and for affixing a second shearing blade along the face plate as to bring the shearing blades into shearing relation as the upper jaw approaches the closed position as to shear through the tires; and
  (d) guide means extending from the face plate into the slot guide adjacent one tine for guiding engagement with the nose tine on the upper C-shaped jaw as the upper jaw swings from opened to closed positions.

* * * * *